United States Patent [19]

Gersdorf et al.

[11] Patent Number: 5,149,747

[45] Date of Patent: Sep. 22, 1992

[54] CARBOXYLIC ESTERS OF HYDROXYL-CONTAINING GRAFT POLYMERS AND PROCESS FOR THEIR PREPARATION

[75] Inventors: Joachim Gersdorf, Wiesbaden; Matthias Kroggel, Kelkheim, both of Fed. Rep. of Germany

[73] Assignee: Hoechst Aktiengesellschaft, Frankfurt am Main, Fed. Rep. of Germany

[21] Appl. No.: 451,331

[22] Filed: Dec. 19, 1989

[30] Foreign Application Priority Data

Dec. 23, 1988 [DE] Fed. Rep. of Germany ....... 3843505

[51] Int. Cl.$^5$ .............................. C08G 18/63
[52] U.S. Cl. .................... 525/454; 525/455
[58] Field of Search .................... 525/454, 455

[56] References Cited

U.S. PATENT DOCUMENTS

| | | | |
|---|---|---|---|
| 3,427,161 | 2/1969 | Laridon et al. | 96/35.1 |
| 4,095,992 | 6/1978 | Rudolph et al. | 525/54.24 |
| 4,223,099 | 9/1980 | von Harpe et al. | 525/455 |
| 4,376,185 | 3/1983 | Alberts et al. | 525/445 |
| 4,517,277 | 5/1985 | Lynch et al. | 430/281 |
| 4,521,546 | 6/1985 | O'Connor et al. | 525/455 |
| 4,540,743 | 9/1985 | Schulz et al. | 522/95 |
| 4,554,240 | 11/1985 | Schulz et al. | 430/285 |
| 4,778,847 | 10/1988 | Schornick et al. | 525/59 |
| 4,849,126 | 7/1989 | Kud et al. | |
| 4,849,307 | 7/1989 | Hoffmann et al. | |
| 4,956,261 | 9/1990 | Pawlowski et al. | 430/271 |

FOREIGN PATENT DOCUMENTS

| | | |
|---|---|---|
| 65535/86 | 5/1987 | Australia . |
| 0308115 | 3/1989 | European Pat. Off. . |
| 0308832 | 3/1989 | European Pat. Off. . |
| 3732089 | 4/1989 | Fed. Rep. of Germany . |
| 922458 | 4/1963 | United Kingdom . |

OTHER PUBLICATIONS

R. T. Morrison and R. N. Boyd, "Organic Chemistry", Fifth ed. Allyn and Bacon, Inc. pp. 868–869.
Houben-Weyl, Methoden der organischen Chemie (Methods of organic Chemistry), vol. 14/2, 1963, pp. 723–728.

Primary Examiner—James J. Seidleck
Assistant Examiner—Thomas Hamilton, III
Attorney, Agent, or Firm—Foley & Lardner

[57] ABSTRACT

The invention describes a graft polymer based on a graft base which contains a polymer comprising diol components and diisocyanate components which has at least two urethane groups in the molecule, onto which graft base have been grafted polymer chains comprising units of vinyl esters of carboxylic acids, having 3 to 20 carbon atoms, and/or hydrolysis products thereof, and optionally units of other ethylenically unsaturated monomers or hydrolysis products thereof and which are additionally esterified in the melt in homogeneous phase with an acylating reagent, in particular with carboxylic anhydrides. The product is insoluble in water, but soluble in aqueous alcohol solution and can be used as a binder in light-curable mixtures for the preparation of relief printing plates. Also described is a process for the preparation of the graft polymers mentioned above, in which on catalyst is used and consequently a colorless product results. The product is obtained from the homogeneous phase.

14 Claims, No Drawings

CARBOXYLIC ESTERS OF HYDROXYL-CONTAINING GRAFT POLYMERS AND PROCESS FOR THEIR PREPARATION

BACKGROUND OF THE INVENTION

The invention relates to hydroxyl-containing graft polymers based on a graft base, which contains a polymer comprising diol components and diisocyanate components which has at least two urethane groups in the molecule, onto which graft base have been grafted polymer chains comprising units of vinyl esters of carboxylic acids, having 3 to 20 carbon atoms, and/or hydrolysis products thereof, and if desired units of other ethylenically unsaturated monomers and/or hydrolysis products thereof.

The compounds of the type described have been disclosed in German Patent Application P 37 32 089.0. The introduction of ester groups into polymers of this type is described, for example, in Houben-Weyl, Methoden der organischen Chemie [Methods of organic Chemistry], volume 14/2, page 723 et seq. (1963).

The modification of hydroxyl groups in polymers likewise belongs to the prior art. In order to carry out this modification, the said polymers are initially reacted with acylating reagents such as for example esters, carboxylic acid chlorides or carboxylic anhydrides. By virtue of this further reaction of the hydroxyl groups of the polymer, it is possible to tailor the solubility of the latter in different solvents.

The reaction as such can be carried out in different ways. According to DE-A 3,144,905 (=U.S. Pat. No. 4,517,277), a polyvinyl alcohol suitable for use as a binder for a light-sensitive recording material is reacted with a large excess of an acylating agent containing polymerizable groups in an aprotic dispersing agent. The disadvantage of this process is that it is necessary to use a large excess of acylating agent, and also that it is not possible to carry out the reaction in solution, but only in suspension.

DE-C 1,522,359 (=U.S. Pat. No. 3,427,161) describes a corresponding reaction of a copolymer of vinyl acetate and vinyl alcohol with methacryloyl chloride in pyridine. In this case, pyridine is both catalyst and reaction medium.

DE-A 3,322,994 (=U.S. Pat. No. 4,554,240) discloses that the excess of acylating agent can be reduced, for example to 1.1 to 1.5 times the molar quantity, by using amines as catalysts, in particular p-aminopyridines. However, the reaction is nevertheless carried out in heterogeneous phase, i.e. in an aprotic dispersing agent.

DE-A 3,541,162 (=AU 86/65535) likewise describes a reaction of polyalkylene oxide-vinyl ester graft copolymers with methacrylic anhydride in the presence of an amine as catalyst, on this occasion: p-dimethylaminopyridine. In this case also, it must be assumed that a heterogeneous reaction is involved - the reaction is carried out in dimethylformamide. Also the starting material is merely swollen in the reaction medium.

Although the excess of carboxylic acid derivatives can be reduced by using the catalysts previously described, there is a great, additional disadvantage with all these catalysts: the products arising from these reactions are colored and therefore have only limited use as binders for light-sensitive mixtures, and even then only with the toleration of great disadvantages.

It is apparent, among other sources, from DE-A 3,534,476 (=U.S. Pat. No. 4,778,847) that the coloration of the products, which is known to those skilled in the art, is due to the catalysts. In this publication, instead of the amino compounds hitherto used as catalyst, a certain imidazole is proposed. Although the coloration of the product is intended to be reduced by the use of this catalyst, a certain coloration is still present according to the reported particulars. Moreover, the practical use of this specific catalyst is less advantageous, since it is relatively expensive. Likewise, the examples given in this publication show that a heterogeneously conducted reaction is involved, since the reactants are merely dispersed in the reaction medium.

SUMMARY OF THE INVENTION

Accordingly, it is an object of the present invention to provide an at least partially esterified hydroxyl-containing polymer which is colorless and can be simply prepared in homogeneous phase, which is the prerequisite for the production of uniform and reproducible products.

Another object of the present invention is to provide a polymer whose solubility in water, aqueous alkali (sodium carbonate solution) or organic solvents can easily be adjusted via the degree of conversion of the esterification reaction. A particular object of the present invention is to provide a polymer which is insoluble in water but soluble in aqueous solutions of alkali or in alcohol, especially in ethanol.

Yet another object of the present invention is to provide a process for producing a polymer as described above.

In accomplishing the foregoing objectives, there has been provided, in accordance with one aspect of the present invention, a graft polymer which comprises the esterification product of a hydroxyl-containing graft polymer with an acylating reagent, esterified in the melt in homogeneous phase, wherein said hydroxyl-containing graft polymer has a graft base which comprises a polymer comprising diol components and diisocyanate components, said polymer having at least two urethane groups in the molecule, onto which graft base have been grafted a plurality of polymer chains comprising units of vinyl esters of carboxylic acids, said vinyl esters having 3 to 20 carbon atoms, and/or hydrolysis products thereof.

In accordance with another aspect of the present invention there is provided a process for producing a graft polymer as defined above.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

The hydroxyl-containing graft polymer according to the invention is based on a graft base which contains a polymer comprising diol components and diisocyanate components which has at least two urethane groups in the molecule, onto which graft base have been grafted polymer chains comprising units of vinyl esters of carboxylic acids and/or hydrolysis products thereof and-/or units of other ethylenically unsaturated monomers and/or hydrolysis products thereof, wherein the graft polymer is esterified with an acylating reagent in the melt in homogeneous phase. Partially esterified graft copolymers are particularly preferred. The proportion, as a percentage, of the grafted-on components is about 10 to 99% by weight, preferably 30 to 90% by weight, particularly 40 to 80% by weight, relative to the total graft polymer.

Graft bases which may be mentioned are those comprising polyurethanes having at least 2 urethane groups in the molecule, the number of urethane groups per graft base molecule being subject to no particular upper limit and generally being greater than 2.

In principle, all diols which can be used in polyurethane synthesis can be employed. Those preferred are cycloaliphatic diols, such as for example cyclohexanediols and aliphatic diols having preferably 2 to 12 carbon atoms. Other preferred diols are polyether diols, for example polypropylene oxides, polybutylene oxides and copolymers of ethylene oxide, propylene oxide and butylene oxide, preferably block copolymers thereof, and polyethylene oxides are particularly preferred.

Preferably, polyether diols are used, particularly polyethylene glycols, having molecular weights between about 200 and 10,000, polyethylene glycols having molecular weights between 400 and 1,500 being particularly preferred. If desired, the polyether diols are used in combination with low molecular weight aliphatic diols, such as for example 1,4-butanediol, 1,3-propanediol, ethylene glycol and diethylene glycol. It is preferable to have a molar ratio of polyether diol to low molecular weight aliphatic diol of about 1:0.1 to 1:0.7.

Diisocyanate components used are aromatic diisocyanates, for example m- and p-xylylene diisocyanate, 2,4-tolylene diisocyanate, 2,6-tolylene diisocyanate or mixtures of the two latter isomers, 1,5-naphthylene diisocyanate, 4,4'-diphenylmethane diisocyanate and 4,4'-phenylbenzyl diisocyanate.

Aliphatic and/or cycloaliphatic diisocyanates are preferably used. Preferred aliphatic diisocyanates are for example those with 2 to 12 carbon atoms in the aliphatic radical, for example ethylene diisocyanate, propylene diisocyanate, tetramethylene diisocyanate, 2,2,4-trimethylhexamethylene diisocyanate. Preferred cycloaliphatic diisocyanates are for example 1,4-diisocyanatocyclohexane, dicyclohexylmethane diisocyanate and isophorone diisocyanate. The use of hexamethylene diisocyanate and isophorone diisocyanate is particularly preferred.

The molar ratio of diol component to diisocyanate component is preferably between about 1:0.99 and 1:0.5, particularly between 1:0.98 and 1:0.7. The average molecular weights of the polyurethanes are preferably between about 200 and 100,000, particularly between 1,300 and 50,000, particularly preferably between 3,000 and 25,000. In order to regulate the molecular weight during the preparation of the polyurethanes, monohydroxy compounds can be used, such as for example methanol, ethanol or other aliphatic alcohols, particularly those of the general formula $C_nH_{2n+2}O$ in which $n=1$ to 4, but half-esterified or half-etherified diols or diol components may also be used. Additionally, monoisocyanates are used for regulating molecular weight.

It should be pointed out that for example for a given molecular weight of the graft base the number of urethane groups in the latter is directly dependent on the molecular weights of the diol and diisocyanate components used.

Vinyl esters of carboxylic acids, having 3 to 20 carbon atoms, preferably having 4 to 14 carbon atoms, are used for grafting onto the polyurethane. Vinyl acetate and/or vinyl propionate are particularly preferred, in particular vinyl acetate. Mixtures of vinyl acetate and/or vinyl propionate and vinyl versatate are also preferred.

In particular, the concomitant use during grafting of vinyl propionate in addition to vinyl acetate is advantageous during partial or complete saponification of the products after graft copolymerization. Moreover, it is possible to graft copolymerizable mixtures of vinyl esters of carboxylic acids, preferably mixtures of vinyl acetate and vinyl versatate, the vinyl versatate component being about 0.2 to 10% by weight, preferably 0.5 to 5% by weight, relative to the vinyl acetate component. It can also be advantageous to graft with different vinyl esters of carboxylic acids in the form of block copolymers, if desired in combination with other ethylenically unsaturated and copolymerizable monomers.

Moreover, the vinyl esters of carboxylic acids may also be grafted together with other ethylenically unsaturated and copolymerizable monomers, such as for example maleic acid, itaconic acid, mesaconic acid, crotonic acid, acrylic acid or esters thereof.

The grafting is carried out with the use of graft catalysts which initiate free-radical chains. For this purpose, it is preferable to consider all radical formers which are soluble in the monomers, the monomer mixture or the monomer solution. The following may be mentioned in particular: organic per-compounds, such as peroxides and percarbonates, and organic azo compounds. Azobisisobutyronitrile and particularly dibenzoyl peroxide are preferred. The grafting reaction is carried out in the presence of preferably about 0.013 to 1.3 mol %, particularly 0.026 to 0.27 mol %, of radical forming catalyst, relative to the quantity of monomers.

The hydroxyl-containing graft polymers which are obtained can be converted by hydrolysis, alcoholysis or transesterification into partially or fully-hydrolyzed products, the degree of hydrolysis being at least 1 mol %, preferably 70 to 99 mol %, relative to the number of moles of hydrolyzable monomer units in the graft polymer.

The process for the preparation of the graft polymers containing hydroxyl groups is described in the German Patent Application P 37 32 089.

Carboxylic anhydrides are particularly suitable as acylating reagents for the preparation of the esterified graft polymers containing hydroxyl groups according to the invention. Alkanecarboxylic anhydrides, alkenecarboxylic anhydrides and/or acryloylcarboxylic anhydrides having 2 to 12 carbon atoms are preferably used. The following may be mentioned by way of example: succinic anhydride, maleic anhydride, citraconic anhydride, glutaric anhydride, phthalic anhydride, cis-4-cyclohexene-1,2-dicarboxylic anhydride, acrylic anhydride, methacrylic anhydride, crotonic anhydride and itaconic anhydride. Mixtures of carboxylic anhydrides may also be used.

The degree of conversion of free hydroxyl groups of the graft polymer with the above acylating reagents for the preparation of the esterified product according to the invention depends on the desired properties of the latter, in particular the solubility properties of the product. Not only hydrolyzed but also partially hydrolyzed graft polymers may be used as starting material for the esterification reaction. Partially hydrolyzed graft polymers are understood to mean, in general, products which are hydrolyzed to the extent of about 80 to 90 mol % (degree of hydrolysis).

Partially hydrolyzed products which have a degree of hydrolysis of 50 to 60% are less usual.

Generally, the degree of conversion of the hydroxyl containing graft polymer with the acylating reagent can be described in such a way that the ratio by weight of graft polymer to acylating reagent, particularly when a carboxylic anhydride is used, is of the order of about 1:0.01 to 1:5, preferably of the order of 1:0.05 to 1:2. This specification is based on partially hydrolyzed graft polymers hydrolyzed to the extent of about 80 to 90%.

The reaction must ultimately be adjusted so that the resulting product can be used as a binder in a light-sensitive mixture. This includes that it must be possible to develop the layer in aqueous alkali (in particular in 1% strength aqueous sodium carbonate solution), but at the same time the developed relief form must not be destroyed by water.

The average molecular weight of the at least partially esterified graft polymers containing hydroxyl groups according to the invention is preferably between about 200 and 50,000, in particular between 1,000 and 26,000, particularly preferably between 3,000 and 17,000. The acid number of the product should be in the range from about 80 to 250 mg of KOH/g of polymer, particularly from 100 to 200 mg of KOH/g of polymer.

The invention also relates to a process for the preparation of the esterified hydroxyl-containing graft polymers.

In the process according to the invention the graft polymer containing hydroxyl groups is melted either without an acylating reagent or else simultaneously with the acylating reagent, preferably without the addition of a solvent. Carboxylic anhydrides are preferably used as acylating reagents. The melt temperature is in general of the order of 80° to 200° C., particularly of the order of 100° to 180° C., and particularly preferably of the order of 120° to 160° C.

The reaction is carried out without the addition of a catalyst which can lead to coloration of the product, in particular without the addition of amines. The reaction time can be kept extremely short and is in the region of a few minutes. The reaction is preferably already finished after a reaction time of less than about 10 min.

Even if the addition of the acylating reagent is not carried out simultaneously with the melting, the esterification can take place in a reaction vessel or processing equipment which is customary for carrying out thermoplastic reactions. Equipment of this kind is, for example, two roll mills, kneaders and extruders. Surprisingly, it has been possible to ascertain, for example, that in the case of a planned maximum 50% conversion of the secondary hydroxyl groups present in the graft polymer (through use of an appropriate molar ratio of the starting materials), the reaction has already run to completion after a few minutes even without the use of the catalyst. The product is obtained in homogeneous phase. It does not exhibit the usually inevitable differences in degree of conversion in the graft polymer; consequently, the product has reacted uniformly and can therefore be prepared reproducibly.

The use of the esterified hydroxyl-containing graft polymers according to the invention is described in German Patent Application P 38 43 506.3 corresponding to copending U.S. application Ser. No. 07/451,970. The polymers according to the invention are used as binders for light-sensitive mixtures, particularly for the preparation of flexographic printing forms.

The invention is explained in more detail with the aid of the following examples, without being limited by them. In addition to the process according to the invention, from which the esterified hydroxyl-containing graft polymer according to the invention results, the preparation of the hydroxyl-containing graft polymer is also described. Among other features, said polymer is characterized by the limiting viscosity $J_o$ ml/g, measured at 25° C. in an Ostwald viscometer. The degrees of hydrolysis (reported in mol %) relate to the totality of hydrolyzable monomer units in the non-hydrolyzed graft polymer.

EXAMPLE 1

Preparation of the Hydroxyl-Containing Graft Polymer a) Synthesis of the polyurethane graft base 3,000 g of polyethylene glycol 600 and 193.1 g of 1,4-butanediol are heated to 75° C. together with 1.5 ml of 1,4-dimethylpiperazine, and 1,428.2 g of isophorone diisocyanate are added over a period of 6 hours. The mixture is then allowed to react further for two hours at 80° C.

The limiting viscosity $J_o$ in methanol of the polyurethane prepared in this manner is 10.6 ml/g.

b) Synthesis of the graft polymer 1,500 g of the polyurethane graft base are heated to 80° C., and a mixture of 3,480 g of vinyl acetate and 26.1 g of dibenzoyl peroxide (75% strength) is added with stirring over a period of 5 hours. After 45 minutes of further reaction at 80° C., the unconverted vinyl acetate is removed by azeotropic distillation with methanol. The limiting viscosity $J_o$ in THF of the graft copolymer prepared in this manner is 17.5 ml/g.

c) Synthesis of the hydroxyl-containing graft polymer 172.1 g of a 10% strength solution of NaOH in methanol and 172.1 g of water are added to 9,178 g of a 50% strength solution of the graft polymer in methanol at room temperature. The mixture gels after a little time and is then granulated. The granules obtained are reduced to a slurry in methanol, and an amount of acetic acid equivalent to the NaOH is added. The product is filtered off, washed repeatedly with methanol and dried: the limiting viscosity $J_o$ in water is 10.1 ml/g, the degree of hydrolysis is 85.8% and the proportion of vinyl alcohol groups is 42.2%.

EXAMPLE 2

Esterification of the Hydroxyl-Containing Graft Polymer

After melting 100 g of the partially saponified graft polymer described in Example 1c) at 140° C. in a two roll mill, 47.8 g of succinic anhydride are added at this temperature. The reaction ends after 6 minutes reaction at 140° C.; a colorless homogeneous product is obtained which has an acid number of 181 mg of KOH/g of polymer. The product is insoluble in water, but dissolves to form a clear solution not only in a 1% strength aqueous sodium carbonate solution but also in ethanol.

EXAMPLE 3

Esterification of the Hydroxyl-Containing Graft Polymer 50 g of the partially hydrolyzed graft polymer described in Example 1c) are melted at 140° C. in a two roll mill. 23.5 g of maleic anhydride and 0.8 g of 2,6-di-tert-butyl-4-methylphenol are then added at 140° C. The reaction is concluded after 4 min. The product obtained is colorless and has an acid number of 133 mg of KOH/g of polymer. It dissolves only sparingly in water to form a cloudy solution, but on the other hand a clear solution is obtained in 1% strength aqueous sodium carbonate solution or in ethanol.

EXAMPLE 4

Esterification of the Hydroxyl-Containing Graft Polymer 200 g of the partially hydrolyzed graft polymer described in Example 1c), 94 g of maleic anhydride and 3.2 g of 2,6-di-tert-butyl-4-methylphenol are mixed and then extruded together at 140° C. over a residence time of 3 min in an extruder with twin counterrotating screws having a ratio of screw length to screw diameter of 15. The colorless homogeneous extrudate has an acid number of 142 mg of KOH/g of polymer and moreover exhibits the same properties as the polymer of Example 3.

What is claimed is:

1. A graft polymer which comprises the esterification product of a hydroxyl-containing graft polymer with an acylating reagent, esterified in the melt in homogeneous phase without addition of a catalyst which can lead to coloration of the product, wherein said hydroxyl-containing graft polymer has a graft base which comprises a polymer comprising diol components and diisocyanate components, said polymer having at least two urethane groups in the molecule, onto which graft base have been grafted a plurality of polymer chains comprising units of vinyl esters of carboxylic acids, said vinyl esters having 3 to 20 carbon atoms, or hydrolysis products thereof.

2. A graft polymer as claimed in claim 1, which is a partially esterified product.

3. A graft polymer as claimed in claim 2, wherein said hydroxyl-containing graft polymer is about 80 to 90 mol % hydrolized.

4. A graft polymer as claimed in claim 3, wherein the ratio by weight of the hydroxyl-containing graft polymer to the acylating reagent is about 1:0.01 to 1:5.

5. A graft polymer as claimed in claim 1, wherein a carboxylic anhydride is used as the acylating reagent.

6. A graft polymer as claimed in claim 1, wherein said polymer has an average molecular weight of about 200 to 100,000.

7. A graft polymer as claimed in claim 6, wherein said polymer has an average molecular weight of 1,300 to 50,000.

8. A graft polymer as claimed in claim 1, wherein said polymer comprises about 10 to 99% by weight of grafted components relative to the total graft polymer.

9. A graft polymer as claimed in claim 8, wherein said polymer comprises 30 to 90% by weight of grafted components relative to the total graft polymer.

10. A graft polymer as claimed in claim 1, wherein the graft base comprises, as diol, a cycloaliphatic diol.

11. A graft polymer as claimed in claim 1, wherein the graft base comprises, as diol, a polyether diol.

12. A graft polymer as claimed in claim 1, wherein the graft base comprises, as diisocyanate, an aliphatic or cycloaliphatic diisocyanate.

13. A graft polymer as claimed in claim 1, wherein the molar ratio of the diol component to the diisocyanate component is about 1:0.99 to 1:0.5.

14. A graft polymer as claimed in claim 1, wherein said polymer chains grafted onto said graft base additionally comprise units of ethylenically unsaturated monomers other than vinyl esters of carboxylic acids, or hydrolysis products thereof.

* * * * *